No. 734,546. PATENTED JULY 28, 1903.
H. HALSEY.
GALVANIC BATTERY.
APPLICATION FILED DEC. 10, 1901.
NO MODEL.

WITNESSES
J. L. Edwards
Raeph Jonas

INVENTOR
Henry Halsey
BY
C. W. Edwards
ATTORNEY

THE NORRIS PETERS CO., PHOTO-LITHO., WASHINGTON, D. C.

No. 734,546. Patented July 28, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

GALVANIC BATTERY.

SPECIFICATION forming part of Letters Patent No. 734,546, dated July 28, 1903.

Application filed December 10, 1901. Serial No. 85,308. (No model.)

*To all whom it may concern:*

Be it known that I, HENRY HALSEY, a citizen of the United States, residing at New York city, in the county of New York and State of New York, have invented certain new and useful Improvements in Galvanic Batteries, of which the following is a full, clear, and exact specification.

My invention relates to batteries; and its object is to provide a battery of simple construction having a minimum weight and bulk and maximum output.

The invention will be described more in detail with reference to the forms thereof shown in the accompanying drawings, in which—

Figure 1:
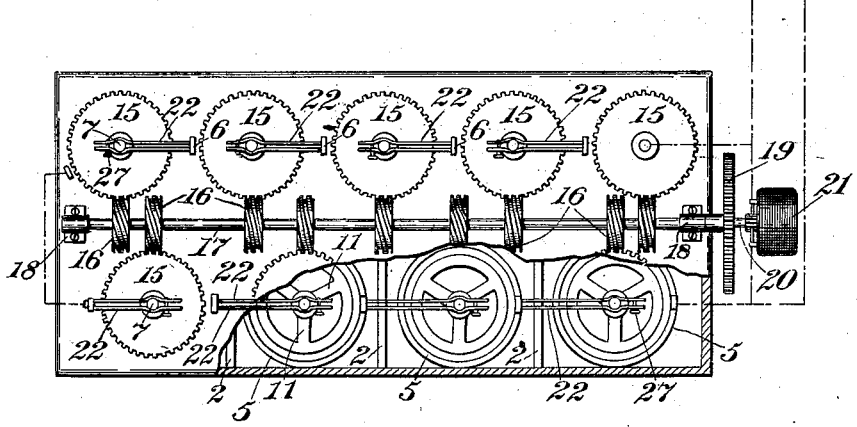
Figure 2:
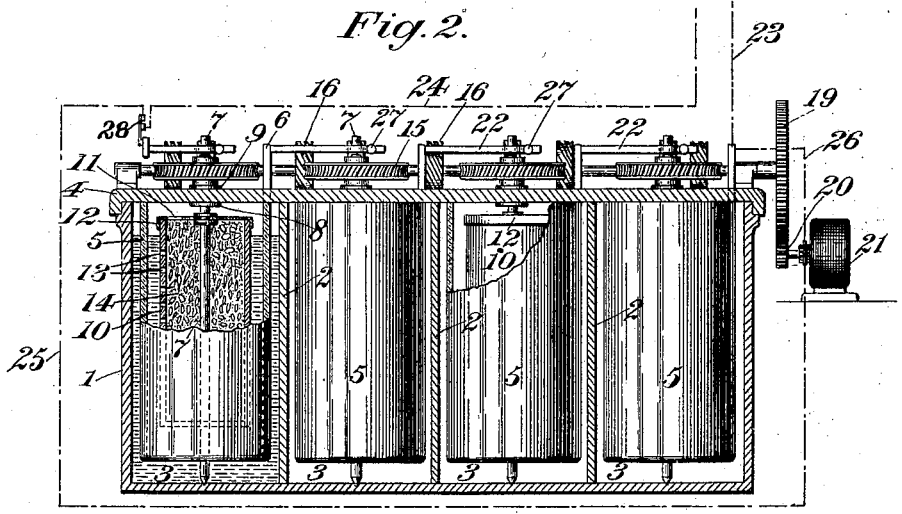

Figure 1 is a top view, partly in section, of a battery embodying my invention. Fig. 2 is a sectional elevation of the same, and Fig. 3 is a top view showing a modified arrangement for moving the elements.

Referring more particularly to the drawings, 1 represents a suitable case divided by partitions 2 2 into a plurality of cells, each of which contains a suitable quantity of excitant solution 3. A cover 4 is suitably fitted upon the top of the receptacle and preferably is arranged to be conveniently raised and lowered thereon. To the cover 4 a plurality of zinc cylinders 5, corresponding in number to the number of cells, are attached, the cylinders extending down into the excitant solution. From each cylinder a contact 6 extends up through the cover 4. A number of shafts 7, also corresponding in number to the number of cells, are journaled in the cover 4, flanges 8 and 9 serving to maintain the shaft in proper position in its bearing and to raise it when the cover is raised. The lower end of the shaft is journaled in any suitable manner in the bottom of the cell. Inside each cell a cylindrical carbon cup 10 is mounted upon shaft 7, the lower end of the cup being closed and the upper end being open, but supported upon the shaft by a copper spider 11, having a flange 12, which fits over the top of the carbon cup. The carbon cup is of porous material and, if preferred, may be provided with perforations 13 13. Bichromate of potassium or other suitable depolarizing agent is maintained within the carbon cup 14. Upon the upper end of each of the shafts 7 is mounted a gear-wheel 15, into which meshes a pinion 16. The pinions 16 are mounted upon a shaft 17, which is journaled in bearings 18 18 carried by the cover 4. Upon the end shaft 17 is a gear-wheel 19, suitably geared to the shaft 20 of a small electric motor 21.

Any number of cells may be employed, and they may be connected with each other in any desired manner. In the drawings I have shown the cells connected in series. The terminals 6, connected to the zinc elements, are each connected by a conductor 22, which for convenience may be slotted, as shown in Fig. 1, and the two parts thereof clamped around the shaft 7 by a screw 27 with the shaft 7 of an adjacent cell, shaft 7 of course being electrically connected to the carbon elements. The main circuit from the battery will be taken from the shaft 7 of one cell at one end of the series of cells, as indicated by wire 23 in the drawings, and from the terminal 6 of the cell at the other end of the series, as indicated by wire 24 in the drawings. The motor 21 is preferably connected with the terminals 6 and 7 in shunt, as indicated by wires 25 and 26 in the drawings. The circuit may be opened by raising the cover 4, and thus removing the elements from the excitant solution, or by a switch 28, which simultaneously opens or closes the main circuit and the shunt-circuit through the motor.

Figure 3:
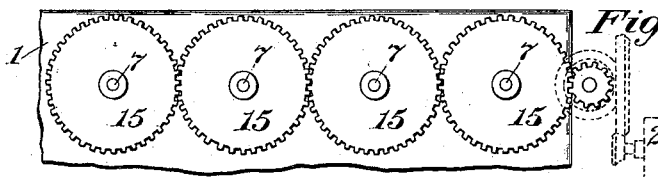

A modified arrangement for driving the moving cells is shown in Fig. 3, wherein the various gear-wheels 15 are arranged to mesh with each other, and one of the wheels is geared to motor 21 in any convenient manner.

In operation, the cups 10 having been filled with a depolarizing agent and the cells having been filled with excitant solution, the switch 28 is closed, and thereupon the high initial force of the battery is expended to start up the motor 21, which, through the gear-wheel 19, shaft 17, pinions 16, and gear-wheel 15, rotates the shafts 10, and thus rotates the carbon cups. The rotation of the carbon elements operates to maintain the excitant solution uniform and also prevents the depolarizing of the battery. The rotation of cup 10 also operates to feed the depolarizing agent to the battery in proportion as it is needed. The perforations 13 may be employed to aid this distribution of the depolarizing agent, if preferred. After the motor has attained its full speed the output of the battery will have increased to maximum output, and as long as the rotation continues this will be maintained.

It will be understood, of course, that the above-described construction may be modified in various respects without departing from the invention, and I therefore desire it to be understood that I do not herein limit myself to the precise construction shown.

Having thus described my invention, I declare that what I claim as new, and desire to secure by Letters Patent, is—

1. In a battery, the combination of a cell containing an excitant solution, a cover therefor, positive and negative elements, and a vertical shaft so journaled in said cover as to be removable therewith and upon which shaft is mounted one of said elements, the other element being suspended from the cover and said shaft extending outside of the cell, and means for rotating said shaft, substantially as described.

2. In a battery, the combination of a plurality of cells, each of which contains an excitant solution, a cover for said solution, positive and negative elements, a vertical shaft in each cell so journaled in said cover as to be removable therewith and upon which shaft is mounted one of said elements, the other element being suspended from the cover and said shaft extending outside of the cell, a driving-shaft common to all of said cells, and gears between said common driving-shaft and each of said vertical shafts, outside of the cells, substantially as described.

3. In a battery, the combination of a cell, containing an excitant solution, positive and negative elements, the negative element comprising a carbon cup containing a depolarizing agent, and means for rotating said carbon cup, substantially as described.

4. In a battery, the combination of a cell containing an excitant solution, positive and negative elements, said negative element comprising a hollow carbon cup having perforated sides, a depolarizing agent contained in said cup, and means for rotating the cup, substantially as described.

5. In a battery, the combination of a plurality of cells, each of which contains an excitant solution and a positive and negative element, one of said elements in each cell being mounted upon a vertical shaft journaled in said cell, a gear-wheel carried by each of said shafts, means for communicating motion of one of said gear-wheels to each of the gear-wheels mounted upon the shafts of the other cells, and means for rotating one of said gear-wheels, substantially as described.

6. In a battery, the combination of a cell containing an excitant solution, a cover therefor, positive and negative elements, one of which is annular in form and surrounds the other, a vertical shaft supporting the inner element, said shaft being so journaled in said cover as to be removable therewith, said shaft being also pivoted upon the bottom of said cell and its upper end extending above the cover, and means for rotating said shaft from outside the cell, substantially as described.

7. In a battery, the combination of a cell containing an excitant solution, and positive and negative elements, one of said elements having a receptacle formed therein, a depolarizing agent in said receptacle, and a revoluble vertically-mounted shaft upon which said last-named element is mounted, substantially as described.

8. In a battery, the combination of a cell containing an excitant solution, a cover therefor, an element, tubular in form, suspended from said cover, a vertical shaft pivoted upon the bottom of said cell and extending above the cover, and a second element supported upon the said shaft inside of the first-named element, substantially as described.

9. In a battery, the combination of a cell containing an excitant, a cover therefor, a vertical shaft pivoted upon the bottom of said cell and extending above the cover, two elements, one of which is suspended from the cover and the other of which is mounted upon said shaft, one of said elements surrounding the other, and means for imparting movement to said shaft, substantially as described.

10. In a battery, the combination of a plurality of cells each of which contains an excitant and a positive and negative element, a cover for said cells, a vertical shaft pivoted upon the bottom of each of said cells, so journaled in said cover as to be removable therewith and extending above the excitant in the cell, one of said elements being mounted upon said shaft and the other being suspended from the cover, a motor, and means whereby movement of said motor is communicated to each of said vertical shafts above the excitant, substantially as described.

11. In a battery, the combination of a case containing a plurality of cells each of which contains an excitant, a cover common to all of said cells, a plurality of elements supported upon said cover and adapted to project into the respective cells, a plurality of shafts journaled in said cover and also adapted to project into said cells, an element mounted upon each of said shafts, and means carried by said cover for imparting movement to all of said shafts, substantially as described.

12. In a battery, the combination of a case containing a plurality of cells each of which contains an excitant, a cover common to all of said cells, a plurality of tubular elements suspended from said cover and projecting into the respective cells, a plurality of shafts journaled in said cover and each adapted to be pivoted upon the bottom of one of said cells, said shafts passing through said tubular elements, an element carried by each of said shafts, and means, also carried by said cover, whereby movement of one shaft is imparted to all the other shafts, substantially as described.

In testimony whereof I affix my signature in presence of two witnesses.

HENRY HALSEY.

Witnesses:
C. V. EDWARDS,
RALPH JONAS.